R. E. FERRIS.
SYSTEM OF CONTROL.
APPLICATION FILED FEB. 4, 1916.

1,318,738.

Patented Oct. 14, 1919.

WITNESSES:
Fred H. Miller
W. B. Wells

INVENTOR
Ralph E. Ferris
BY
Wesley G. Carr
ATTORNEY

UNITED STATES PATENT OFFICE.

RALPH E. FERRIS, OF SWISSVALE, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,318,738.

Specification of Letters Patent. Patented Oct. 14, 1919.

Application filed February 4, 1916. Serial No. 76,158.

*To all whom it may concern:*

Be it known that I, RALPH E. FERRIS, a citizen of the United States, and a resident of Swissvale, in the county of Allegheny and State of Pennsylvania, have invented a new and useful Improvement in Systems of Control, of which the following is a specification.

My invention relates to control systems for dynamo-electric machines adapted to generate electric currents and particularly to means for energizing the field-magnet windings of such machines.

One object of my invention is to provide a generator with means which shall automatically maintain the generated voltage substantially constant through a wide range of speed thereof.

Another object of my invention is to provide a generator with a plurality of exciting generators which shall maintain the generated voltage of the generator substantially constant through a wide range of speed thereof and then shall raise or lower the generated voltage according to whether an even or an odd number of exciting generators is employed.

More specifically, my invention embodies a generator which is provided with two sets of field-magnet windings. The two sets of field-magnet windings oppose each other and are energized by separate sources of current. One set of field-magnet windings is energized from a constant-potential source of current and the other set is energized from a variable source of current the potential of which varies in accordance with the speed of the generator. Thus, as the generator gains speed, the exciting field thereof is weakened, and, until a critical speed is reached, the voltage is maintained practically constant. However, after the critical speed is passed, the generated voltage will rise or fall very rapidly according to whether an even or an odd number of exciting generators is employed in exciting the generator.

Figure 1:
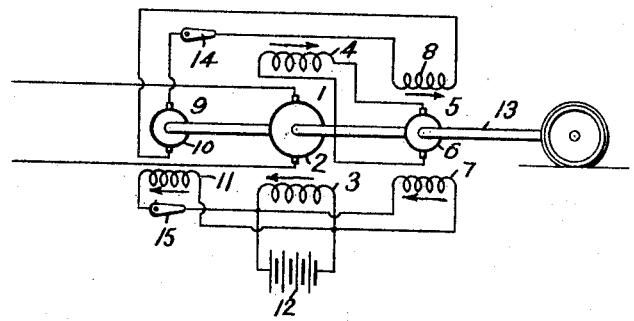
Figure 2:
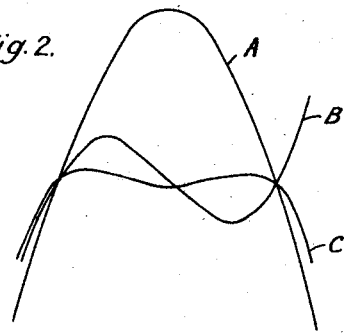

In the accompanying drawing Figure 1 is a diagrammatic view of a car-lighting system constructed in accordance with my invention; Fig. 2 is a diagram embodying a number of curves illustrating the variations in the generated voltage according to the number of exciting generators employed, and Fig. 3 is a control system similar to the one illustrated in Fig. 1 and employing three exciting generators.

Referring to Fig. 1 of the drawing, a control system for effecting car lighting is shown embodying a generator 1 having an armature 2 and field-magnet windings 3 and 4, an exciting generator 5 having an armature 6 and field-magnet windings 7 and 8, an exciting generator 9 having an armature 10 and a field-magnet winding 11 and a constant potential battery 12. The armatures 2, 6, and 10 are shown mounted on a car axle 13, but any other well known means of connecting the armatures to the car axle may be employed, provided the ratio of the speeds of the generators is maintained constant. The field windings 3, 7 and 11 are energized by the battery 12; the field winding 4 of the generator 1 is energized by the exciting generator 5, and the winding 8 of the exciting generator 5 is energized by the exciting generator 9. The field windings 3 and 4 of the generator 1 and the field windings 7 and 8 of the exciter 5 are differentially wound to oppose each other, when energized. Switches 14 and 15 are provided for breaking the circuit of the armature 10 and that of the field winding 11, respectively.

Figure 3:
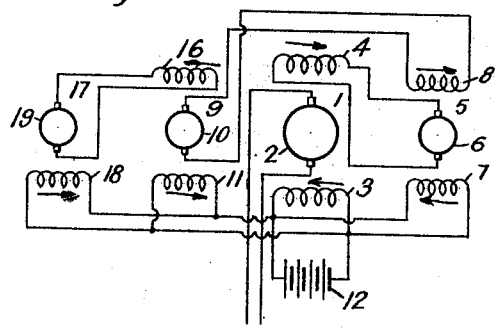

In Fig. 3, the parts which are similar to those in Fig. 1 are designated by similar reference characters. The exciting generator 9 is provided with an additional field winding 16 which opposes the field winding 11. The winding 16 is energized by an exciting generator 17 embodying an armature 19 and a field winding 18 which is energized by the battery 12.

In Fig. 2, the curves A, B and C are plotted with voltage as the ordinate and with speed as the abscissa. Curve A represents the voltage generated by generator 1 at various speeds when excited by one exciting generator, as when switches 14 and 15 in Fig. 1 are opened. Curve B represents the voltage of generator 1 at various speeds when connected to the exciting generators 5 and 9, as shown in Fig. 1. Curve C represents the voltage of generator 1 at various speeds when connected to the exciting generators 5, 9 and 17, as illustrated in Fig. 3.

In operating the system shown in Figs. 1 and 3, the field windings 3 maintain a constant field by reason of being energized by the constant-potential battery 12. The field produced by the windings 4, however, varies as the speed of the exciting generator varies. As the speed of the generator increases, the voltage generated by the same would increase if the field excitation remained constant. According to my invention, the field winding 4 opposes the field winding 3 and becomes stronger as the speed of the generator increases at a rate sufficient to maintain the voltage of the generator substantially constant. When the machine reaches a certain critical speed, however, the voltage may no longer be maintained constant but rapidly increases or decreases, according to whether an even or an odd number of exciting generators is employed.

In case the switches 14 and 15 of Fig. 1 are opened, the generator 1 is disconnected from the exciter 9 and has its field windings 3 and 4 energized by the battery 12 and the exciter 5. The voltage generated by the exciter 5 increases with the speed of the machine as the field winding 7 of the same is energized by a source having a constant potential. Accordingly, voltages are generated by generator 1 at the various speeds of the same as represented by curve A in Fig. 2. As indicated by curve A, the voltage begins to decrease rapidly when the field winding 4 overcomes the field winding 3.

In case the switches 14 and 15 are closed, the field winding 8 of the exciter 5 is connected to the exciter 9, and the field winding 11 of the exciter 9 is connected to the battery 12. With the system thus connected, the generator 1 will produce voltages at various speeds, as represented by curve B in Fig. 2. As the speed of the generator 1 and the exciters 5 and 9 increases, the voltage of generator 1 increases until the voltage of exciter 5 builds up and strengthens the field windings 4 of the generator 1. As the voltage of exciter 5 increases, the voltage of generator 1 decreases until the field winding 8 overpowers the field winding 7, at which time the voltage generated by the exciter 5 decreases and, accordingly, the voltage generated by generator 1 will increase.

In case a third exciting generator, as 17 in Fig. 3, is added to the system, the generator 1 will produce voltages at various speeds in accordance with curve C in Fig. 2. As the exciter 9 is energized by the differential field windings 11 and 16, the voltage generated by the same increases to a certain point and then decreases in a manner represented by curve A in Fig. 2. The exciter 5 being controlled by exciters 17 and 9, has a voltage curve similar to the curve B in Fig. 2. The generator 1 is controlled by the exciters 17, 9 and 5, and, accordingly, the rise and fall of the voltage in each of the exciters will have an effect upon the voltage of generator 1 to produce a voltage curve as represented by C in Fig. 2.

Referring to the curves, it may be noted that, as the number of exciters is increased, the voltage of generator 1 is maintained more nearly uniform, an odd number of exciters maintaining the generated voltage substantially constant through a wide range of speed of the generator and then lowering the voltage at a rapid rate, and an even number of exciters maintaining the generated voltage substantially constant through a wide range of speed of the generator and then increasing the voltage at a rapid rate. In case the same relative flux density is obtained in all the machines, the curves shown in Fig. 2 are not materially affected by saturation of the machines, and, if the saturation point of the machines is increased by an approximately constant ratio, starting with the generator 1, the voltage curve may be further smoothed out.

The choice of an odd or an even number of exciting generators will depend upon the desired operating characteristics of the system, and each class has certain advantages. In general terms an odd number of auxiliary generators acts as an inherent current-limiting device for the main generator, while an even number of such generators introduces an inherent speed-limiting feature into regenerative or other systems of the familiar type wherein field-winding excitation for the main motors of the vehicle is supplied by the illustrated main generator.

More specifically stated, when the main-generator speed exceeds the critical value, in the case of an odd number of exciting generators, the voltage of the main generator decreases so rapidly that, irrespective of further increase of speed, the main-generator current is prevented from rising to a relatively high value. On the other hand, in the case of an even number of exciting generators, an increase of main-generator speed beyond the critical value rapidly increases the voltage of the main generator and, therefore, of the main-motor field-winding that is energized thereby in the above-mentioned regenerative or other system. Such increased field excitation for the main motors of the vehicle will correspondingly reduce their speed, in accordance with familiar principles, and thus also decrease the speed of the illustrated axle-driven generators.

Assuming totally unsaturated machines, the voltage curves above described may be demonstrated mathematically, as follows: VI, the voltage of generator 1, as an unsaturated machine, is proportional to the resultant ampere turns (A. T.) of the field windings of generator 1 and the speeds.

Where—
TR1=resultant ampere turns of windings 3 and 4.
T1=ampere turns of field winding 3.
T2=ampere turns of field winding 4.
TR2=resultant ampere turns of windings 7 and 8.
T3=ampere turns of field winding 7.
T4=ampere turns of field winding 8.
TR3=ampere turns of field windings 11.
S=speed of generators.
V2=voltage of generator 5.
V3=voltage of generator 9.

We have—
V1 varies as TR1×S
TR1 " " T1−T2
T2 " " V2
V2 " " TR2×S
TR2 " " T3−T4
T4 " " V3
V3 " " TR3×S
Substitute T4 for V3
T4 varies as TR3×S
Substitute T3−TR2 for T4
TR2 varies as T3−TR3×S
Substitute V2/S for TR2
V2 varies as T3S−TR3×S$^2$
T2 " " T3S−TR3×S$^2$
Substitute T1−TR1 for T2
TR1 varies as T1−T3S+TR3S$^2$
Substituting V1/S for TR1
Finally we have V1 varies as $$T1S - T3S^2 + TR3S^3$$

Similarly, it may be shown that $$V1 = T1S - T3S^2 + T5S^3 - T7S^4 + T9S^5 \mp$$

if a larger number of exciters is to be used as previously suggested. In order to actually improve, i. e. render flatter, the voltage V1 by adding further exciter machines, the above series must not be rapidly diverging. Since S is larger than 1, it is evident that the factors S, S$^2$, S$^3$, etc. are rapidly diverging: It follows, therefore, that the factors T1, T3, T5, etc. must be converging in order to have products T1S, T3S$^2$, T5S$^3$, etc. also converging, or at least not rapidly diverging. This means that the influence of the exciters must be the smaller, the farther the exciter is away from the main generator.

It is evident that modifications in the system may be effected without departing from the spirit and scope of my invention, and I desire that only such limitations shall be imposed as are indicated in the appended claims.

I claim as my invention:

1. In a control system, the combination with a main generator having an armature and two field-magnet windings, of an exciting generator having an armature and two field-magnet windings, a second exciting generator having an armature and one field winding and a battery for energizing one field winding of the main generator and of each of the exciting generators, of means for exciting one field winding of the main generator by the first exciting generator and for exciting one field winding of the first exciting generator by the second exciting generator, whereby said main generator maintains a uniform voltage through a wide range of speed thereof.

2. In a control system, the combination with a main generator having an armature and a plurality of field-magnet windings, of an auxiliary source of energy for one of said field windings, and a plurality of auxiliary generators, one connected for exciting another of said field windings, at least one of said auxiliary generators having one field winding energized from said source and a second field winding energized from another auxiliary generator.

3. In a control system, the combination with a plurality of generators having armatures and field windings, of substantially constant-voltage means for exciting one field winding of each generator, and means for connecting each succeeding generator to differentially excite a field winding of the preceding generator and produce a voltage in the first generator that is substantially constant through a predetermined range and is then raised or lowered according as the number of generators is odd or even.

4. In a control system, the combination with a main generator having armature and field-magnet windings, of a plurality of exciting generators having armatures and field-magnet windings, means for effecting common rotation of all the armatures, means for energizing one field winding of each succeeding generator from the preceding generator, and an auxiliary source of energy connected to energize a field winding of each generator.

5. A plurality of generators having commonly-driven armatures and severally having a plurality of field windings, another generator having an armature rotatable with the others and having a single field winding, substantially constant-voltage means for exciting one field winding of each generator, and means for connecting each succeeding armature to excite a field winding of the preceding generator.

In testimony whereof, I have hereunto subscribed my name this 29th day of Jan. 1916.

RALPH E. FERRIS.

Copies of this patent may be obtained for five cents each, by addressing the "Commissioner of Patents Washington, D. C."